US009100631B2

(12) United States Patent
Broberg et al.

(10) Patent No.: US 9,100,631 B2
(45) Date of Patent: Aug. 4, 2015

(54) DYNAMIC PICTURE QUALITY CONTROL

(71) Applicant: Cable Television Laboratories, Inc., Louisville, CO (US)

(72) Inventors: David K. Broberg, Lafayette, CO (US); Arianne Therese Hinds, Louisville, CO (US)

(73) Assignee: CABLE TELEVISION LABORATORIES, INC., Louisville, CO (US)

( * ) Notice: Subject to any disclaimer, the term of this patent is extended or adjusted under 35 U.S.C. 154(b) by 0 days.

(21) Appl. No.: 13/959,478

(22) Filed: Aug. 5, 2013

(65) Prior Publication Data

US 2015/0036051 A1 Feb. 5, 2015

(51) Int. Cl.
| | |
|---|---|
| *H04N 5/91* | (2006.01) |
| *H04N 9/804* | (2006.01) |
| *H04N 5/14* | (2006.01) |
| *H04N 5/262* | (2006.01) |
| *H04N 7/12* | (2006.01) |
| *H04M 3/00* | (2006.01) |

(52) U.S. Cl.
CPC . *H04N 5/91* (2013.01); *H04N 9/804* (2013.01)

(58) Field of Classification Search
CPC ............. H04N 5/14; H04N 5/20; H04N 5/21; H04N 5/44; H04N 5/91
See application file for complete search history.

(56) References Cited

U.S. PATENT DOCUMENTS

| | | | | |
|---|---|---|---|---|
| 2003/0156649 | A1* | 8/2003 | Abrams, Jr. ............... | 375/240.24 |
| 2004/0022322 | A1* | 2/2004 | Dye ......................... | 375/240.26 |
| 2010/0111489 | A1* | 5/2010 | Presler ...................... | 386/52 |
| 2012/0218442 | A1* | 8/2012 | Jandhyala et al. ........... | 348/239 |
| 2013/0182755 | A1* | 7/2013 | Chen et al. ................ | 375/240.01 |
| 2013/0183952 | A1* | 7/2013 | Davis et al. ................ | 455/418 |
| 2014/0037206 | A1* | 2/2014 | Newton et al. ............... | 382/166 |

\* cited by examiner

*Primary Examiner* — Jeffrey Harold
*Assistant Examiner* — Sean Haiem
(74) *Attorney, Agent, or Firm* — Davis Wright Tremaine LLP; James S. Hsue; Heather M. Colburn

(57) ABSTRACT

A method performed by one or more computing devices. The method includes identifying first and second portions of a digital video signal. First and second values of a plurality of quality metrics are determined for the first and second portions, respectively. The first and second values of the metrics are used to determine first and second values, respectively, of a plurality of picture quality parameters such that a signal transmitted using either the first or second values of the parameters would require at most a maximum output bitrate. The first values of the parameters may differ from the second values of the parameters. The first and second portions are adjusted using the first and second values, respectively, of the parameters. The first and second adjusted portions are transmitted in a continuous signal. Optionally, the first and second adjusted portions are compressed before they are transmitted.

24 Claims, 6 Drawing Sheets

DYNAMIC PICTURE QUALITY CONTROL

BACKGROUND OF THE INVENTION

1. Field of the Invention

The present invention is directed generally to systems and methods for improving the picture quality of digital video.

2. Description of the Related Art

In the uncompressed domain, three picture quality parameters primarily determine the picture quality of digital video:

1. Frame size (which determines resolution or detail);
2. Frame rate (which determines fluidity of motion); and
3. Color depth (which determines quantization or the smoothness of shading).

Color depth does not necessary refer to color (e.g., red, green, blue, and the like). Instead, color depth refers to a number of bits used to represent a portion (e.g., a pixel) of an image. For example, a grayscale image may have a color depth of 8 bits. This means each pixel has a color value between 0 (black) and 255 (white). Thus, color depth may also be referred to as a "pixel depth" or "bit depth" parameter.

Increasing the value of each of the three picture quality parameters improves video quality under certain conditions. For example, by increasing the frame size, higher resolution digital video may be created. For example, 4K and 8K resolution video, which use large frame sizes (3840 pixels by 2160 pixels, and 7860 pixels by 4320 pixels, respectively), may be used to provide ultra-high resolution video.

By increasing frame rate, more realistic motion may be achieved. For example, movies are moving away from the historic frame rate of 24 frames per second ("fps") to 48 fps. Further, even higher frame rates have been proposed (e.g., up to 120 fps for capture). Television sports programming has been forced to compromise and use smaller frame sizes (1280 pixels by 720 pixels) when offering higher frame rates (e.g., 60 fps) or use interlace scanning with larger frame sizes (e.g., 1920 pixels by 1080 pixels). Nevertheless, the trend is moving toward a frame size of 1920 pixels by 1080 pixels offered at a frame rate of 60 fps.

Further, the quality of digital video may be improved by increasing bit depth. For example, progress is being made to expand the bit depth in bits per pixel ("bpp") beyond the traditional 8 bpp per color (i.e., a total of 24 bpp) to 10 bpp per color (i.e., a total of 30 bpp), or 12 bpp per color (i.e., a total of 36 bpp). Further, 16 bpp per color (i.e., a total of 48 bpp) have been proposed.

While increasing each of the three picture quality parameters may increase the picture quality of digital video, such increases also require more memory for image storage and higher bandwidth for transmission. FIGS. 1-3 illustrate such tradeoffs.

FIG. 1 is a graph in which the x-axis is bit depth measured in bpp and the y-axis is data (or bit) rate (uncompressed) measured in Gigabits per second ("Gbps"). Line 100 is plot of an uncompressed bitrate for digital video having the highest proposed (8K) frame size (or resolution) and the highest proposed frame rate (120 fps) as bit depth increases along the x-axis. The line 100 illustrates a large increase in uncompressed bitrate as the number of bpp (bit depth) increases. This means the interface bandwidth needed to send uncompressed 8K digital video ranges from about 48 Gbps to over 140 Gbps (if deep color at 12 bits per pixel, per color (i.e., a total of 36 bpp) is used).

FIG. 2 is a graph in which the x-axis is frame rate measured in fps and the y-axis is data (or bit) rate (uncompressed) measured in gigabits per second. Line 200 is plot of an uncompressed bitrate for digital video having the highest proposed (8K) frame size (or resolution) and a bit depth of 4:4:4 (i.e., a total of 24 bpp) as the frame rate increases along the x-axis. The line 200 illustrates an increase in uncompressed bitrate as the frame rate increases from 24 fps to 120 fps. In this example, the bandwidth requirements for 8K digital video increases from just under 20 Gbps to about 96 Gbps.

FIG. 3 is a graph in which the x-axis is frame size measured in pixels and the y-axis is data (or bit) rate (uncompressed) measured in gigabits per second. Line 300 is plot of an uncompressed bitrate for digital video having a frame rate of 120 fps and a bit depth of 4:4:4 (i.e., a total of 24 bpp) as the frame size increases along the x-axis. The line 300 illustrates the increase in uncompressed bitrate as the frame size (resolution) increases from 1280 pixels by 720 pixels to 8K pixels. In this example, the increase in bitrate appears to be somewhat modest until the frame size exceeds 4K at which point the bitrate increases dramatically to about 96 Gbps.

In currently available digital video systems, a single value for each of the three picture quality parameters is designated for video in both the compressed and uncompressed domains. Further, decoders are designed with those picture quality parameter values in mind and optimized to operate with just a few settings. While some minor changes to the values of picture quality parameters are possible (for example changes to the value of the frame size parameter), such changes are disruptive and cannot be performed dynamically.

Therefore, a need exists for methods and systems that adjust the values of the three picture quality parameters without undesirable disruptions in the picture quality and in the content delivery ecosystem. Systems and methods that make such adjustments dynamically based on the content of the digital video would be particularly desirable. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
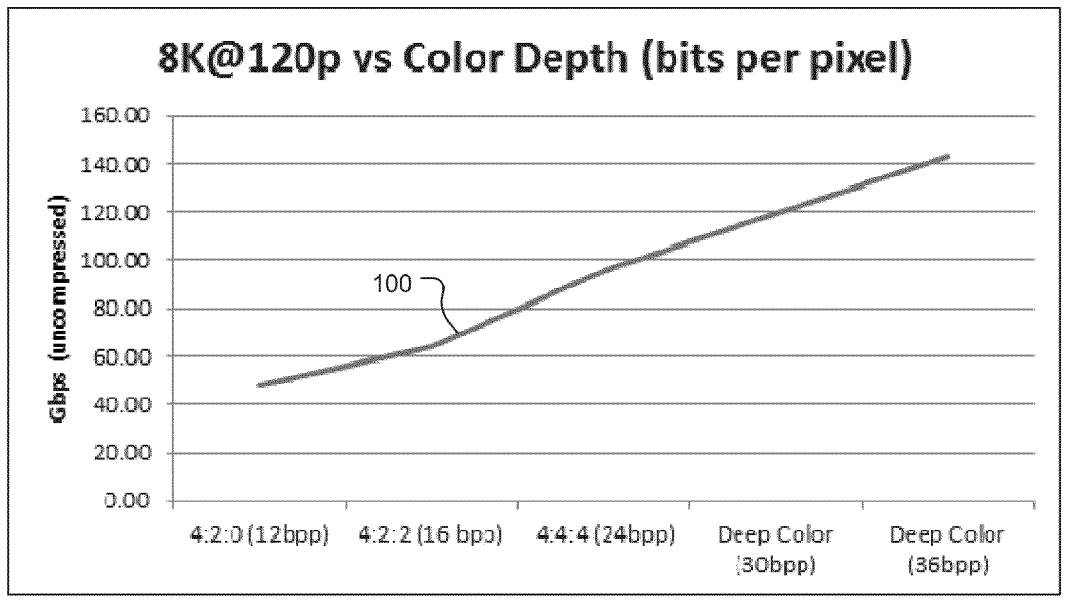
FIG. 1 is a graph in which the x-axis is bit depth measured in bpp and the y-axis is data (or bit) rate (uncompressed) measured in gigabits per second.
Figure 2:
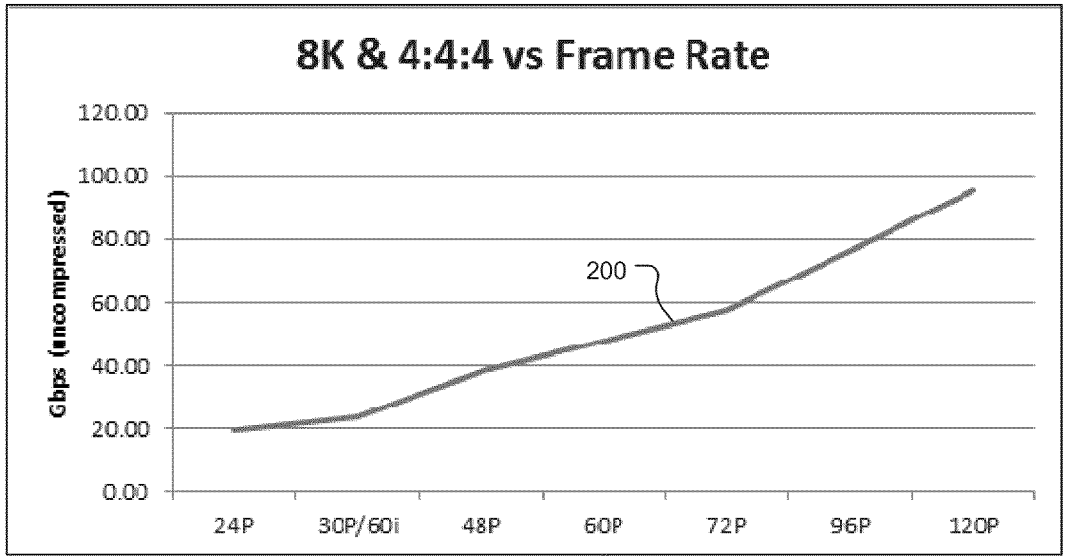
FIG. 2 is a graph in which the x-axis is frame rate measured in fps and the y-axis is data (or bit) rate (uncompressed) measured in gigabits per second.
Figure 3:
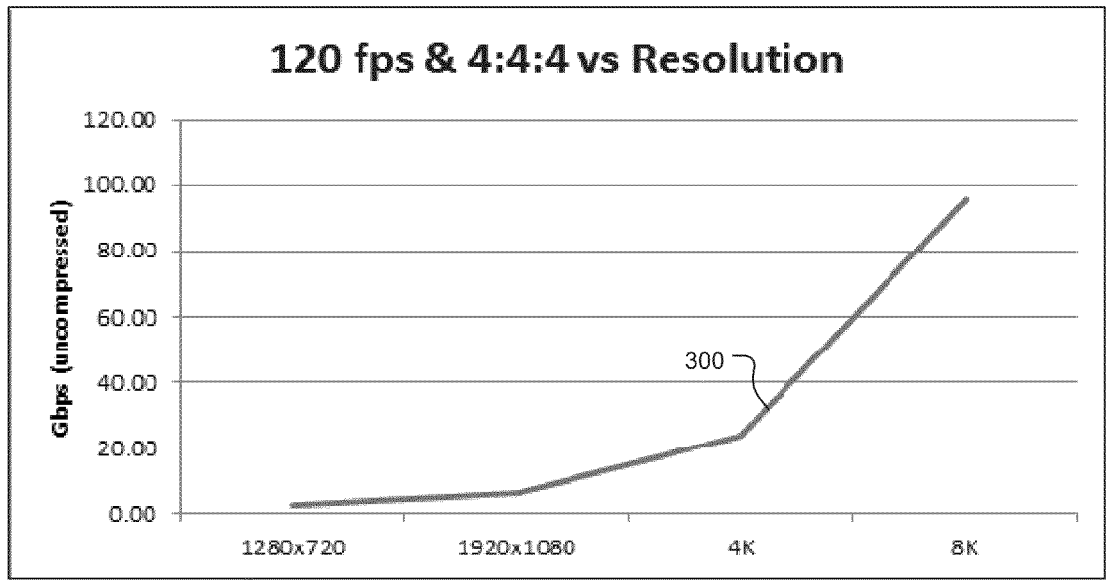
FIG. 3 is a graph in which the x-axis is frame size measured in pixels and the y-axis is data (or bit) rate (uncompressed) measured in gigabits per second.

One can conclude from the graphs depicted in FIGS. 1-3 that if transmission related limitations (e.g., physical limitations of a digital video interface, memory bus speed, and the like) limit the transmission bitrate to below 150 Gbps, it is impossible to simultaneously provide the best quality digital video in all three picture quality dimensions (frame size, frame rate, and bit depth). In other words, a bitrate of at least 150 Gbps is required to transmit digital video in which each of the three picture quality parameters is set to the largest available value. Thus, if the maximum bitrate available is below 150 Gbps, the value of at least one of the three picture quality parameters must be less than the largest value available. On the other hand, if transmission related limitations limit the transmission bitrate to as low as 20 Gbps, it is possible to provide digital video in which the values of at least one or two of three picture quality parameters is set to the largest value available, or the values are set to deliver a predetermined perceived picture quality.

Figure 4:
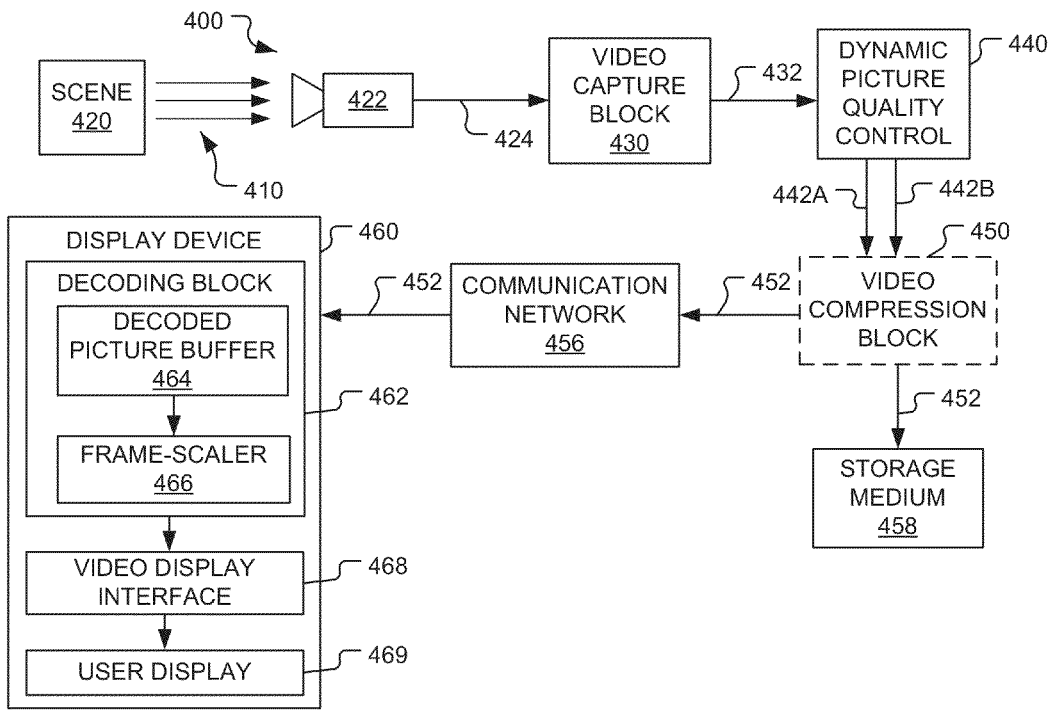
FIG. 4 is a block diagram of a digital video capture, transmission, and display system that includes a dynamic picture quality control.

FIG. 4 is a block diagram of a digital video capture and transmission system 400. Light (depicted by arrows 410) from a scene 420 is sensed by a camera 422, which provides analog or digital signals 424 (encoding images of the scene 420) to a video capture block 430. The camera 422 may be implemented using any image capture technology, such as cameras that employ charged coupled devices ("CCD") or complementary metal-oxide-semiconductor ("CMOS") devices that accumulate electrical charges in response to the light (depicted by arrows 410). The video capture block 430 converts the analog or digital signals 424 received from the camera 422 into an uncompressed digital video signal 432 that includes a series of uncompressed images (not shown) of the scene 420.

The uncompressed digital video signal 432 is sent to a dynamic picture quality control 440 that (as explained below) calculates the value of one or more of the three picture quality parameters (frame size, frame rate, and bit depth) of at least a portion of the series of uncompressed images (not shown) of the scene 420. In some embodiments, the dynamic picture quality control 440 uses the calculated value(s) to adjust the uncompressed digital video signal 432 directly. In such embodiments, the dynamic picture quality control 440 receives the uncompressed digital video signal 432 as an input and outputs an adjusted digital video signal 442A that includes a series of uncompressed adjusted images (not shown) of the scene 420.

In alternate embodiments, the dynamic picture quality control 440 adds the calculated value(s) to the uncompressed digital video signal 432 as picture quality metadata to produce a modified digital video signal 442B. In such embodiments, the modified digital video signal 442B includes the original uncompressed signal 432, and the picture quality metadata computed by the dynamic picture quality control 440.

Optionally, the adjusted digital video signal 442A may be supplied to an optional video compression block 450 that compresses the series of uncompressed adjusted images (e.g., using a conventional lossy compression technique, such as one in accordance with one of the MPEG standards, or a lossless technique, such one in accordance with the JPEG2000 standard) to create a compressed adjusted digital video signal 452.

In alternate embodiments, the modified digital video signal 442B is supplied to the video compression block 450, which adjusts the original uncompressed signal 432 using the picture quality metadata, and compresses the adjusted signal to create the compressed adjusted digital video signal 452. Thus, the video compression block 450 may use the value of one or more of the three picture quality parameters (frame size, frame rate, and bit depth) provided in the metadata to produce the compressed adjusted digital video signal 452, which is adjusted to provide a picture quality determined by the values of the picture quality parameters. In this such embodiments, the video compression block 450 may be characterized as being a Dynamic Picture Quality Control, and the dynamic picture quality control 440 may be characterized as being a Dynamic Picture Quality Detector. Optionally, the dynamic picture quality control 440 and the video compression block 450 may be joined or combined into a single functional block or operate as separate functional blocks as illustrated in FIG. 4.

Then, the uncompressed or compressed adjusted digital video signal 442A or 452 may be transmitted to a communication network 456 (such as a cable television network, the Internet, or the like), and/or stored in a storage medium 458.

The uncompressed or compressed adjusted digital video signal 442A or 452 may be transmitted over the communication network 456 to one or more display devices like a display device 460 (e.g., a television, a computing device, and the like). In some embodiments, each of the display devices is configured to display images at a selected frame size, a selected bit depth, and/or a selected frame rate.

Each of the display devices may include or be connected to a decoding block 462 configured to decode the uncompressed or compressed adjusted digital video signal 442A or 452 to reconstruct the series of uncompressed adjusted images (not shown) in a format displayable by the display devices. The decoding block 462 includes or is connected to a decoded picture buffer 464, and a frame-scaler 466. The decoded picture buffer 464 stores the images decoded from the uncompressed or compressed adjusted digital video signal 442A or 452 in a format displayable by the display device 460. The frame-scaler 466 scales any of the decoded images having a frame size that is different from the selected frame size used by the display device 460.

Each of the display devices may include or be connected to a video display interface 468 and a user display 469. The video display interface 468 receives a video signal from the decoding block 462, and optionally adjusts the video signal for display by the user display 469. The user display 469 receives the video signal from the video display interface 468 and displays the digital video encoded therein to a user. By way of non-limiting examples, the user display 469 may be implemented using a conventional computer monitor, television, and the like.

Figure 5:
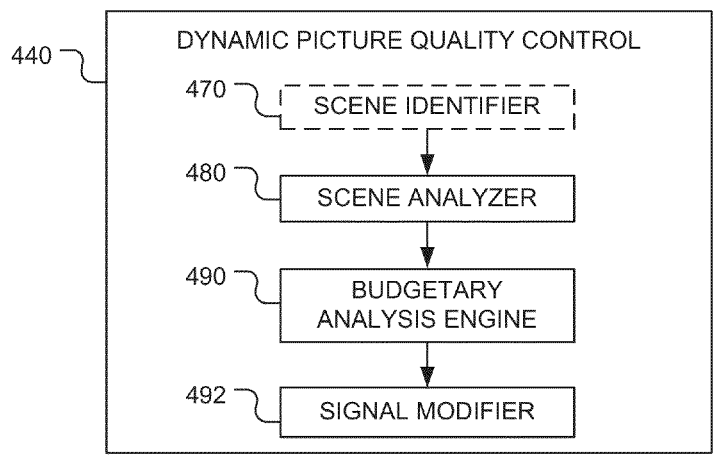
FIG. 5 is a block diagram illustrating a scene analyzer, a budgetary analysis engine, and other components of the dynamic picture quality control of the system of FIG. 4.

FIG. 5 is a block diagram illustrating the components of the dynamic picture quality control 440. The dynamic picture quality control 440 analyzes (as input) the uncompressed digital video signal 432 (see FIG. 4) along three separate axes (amount of detail, amount of motion, and dynamic range), and determines the values of the three picture quality parameters (frame size, frame rate, and bit depth) used to create the adjusted digital video signal 442A or the modified digital video signal 442B in a manner that preserves signal quality within an output bandwidth (or bitrate) constraint. Thus, the dynamic picture quality control 440 may be configured to provide the highest possible fidelity in each of the three picture quality parameters while optimizing bandwidth utilization.

The values calculated by the dynamic picture quality control 440 are used (by the dynamic picture quality control 440 or the video compression block 450) to dynamically adjust the values of the three picture quality parameters to maximize perceived picture quality to satisfy the output bandwidth (or bitrate) constraint. For example, scenes with a large amount of fine detail have a better picture quality when larger frame sizes are used. When this is the case, the dynamic picture quality control 440 may allocate greater priority to the frame size parameter, which means the dynamic picture quality control 440 will allocate more bandwidth to the frame size parameter, and optionally less bandwidth to the frame rate and bit depth parameters. On the other hand, scenes with a lot of action or motion have a better picture quality when larger higher frame rates are used. Under these circumstances, the dynamic picture quality control 440 may allocate greater priority to the frame rate parameter, which means the dynamic picture quality control 440 will allocate more bandwidth to the frame rate parameter, and optionally less to the frame size and bit depth parameters. Further, scenes with smooth, stationary areas of subtle color variations or lightness variations have a better picture quality when greater bit depths are used. For such scenes, the dynamic picture quality control 440 may allocate greater priority to the bit depth parameter, which means the dynamic picture quality control 440 will allocate more bandwidth to the bit depth parameter, and optionally less to the frame size and frame rate parameters. If the output bandwidth (or bitrate) constraint is such that the values of all three of the picture quality parameters can be maximized without exceeding the constraint, the dynamic picture quality control 440 may optionally set the picture quality parameters to their respective maximum values.

The output bandwidth (or bitrate) constraint may be determined based on existing technology and adapted (or increased) later as higher bandwidth techniques become available. The output bandwidth (or bitrate) constraint may also adapt to current network conditions based on network protocols that provide such information (e.g., bit error rate information, packet loss information, and the like).

As mentioned above, the uncompressed digital video signal 432 (see FIG. 4) includes a series of uncompressed images (not shown) of the scene 420. Each image is referred to as a "frame." A scene is made up of a series or sequence of consecutive frames in the uncompressed digital video signal 432. The dynamic picture quality control 440 may analyze the uncompressed digital video signal 432 (see FIG. 4) on a scene-by-scene basis, a frame-by-frame basis, or based on portions (e.g., macroblocks) of a frame (e.g., within a single frame or across multiple consecutive frames). For ease of illustration, the dynamic picture quality control 440 will be described as analyzing the uncompressed digital video signal 432 (see FIG. 4) on a scene-by-scene basis. However, through application of ordinary skill in the art to the present teachings, other embodiments may be constructed in which the dynamic picture quality control 440 analyzes the uncompressed digital video signal 432 on a different basis (e.g., a frame-by-frame basis, a macroblock-by-macroblock basis, and the like).

The dynamic picture quality control 440 includes a scene identifier 470, a three-axis scene analyzer 480, a three-axis budgetary analysis engine 490, and a signal modifier 492.

The scene identifier 470 uses real-time image processing techniques to analyze the uncompressed digital video signal 432 (see FIG. 4), and detect scenes, frames, or areas (e.g., macroblocks) within a frame that demand greater performance in one or two of the same picture quality dimensions (frame size, frame rate, and bit depth). For ease of illustration, the scene identifier 470 will be described as having identified scenes in the uncompressed digital video signal 432 (see FIG. 4). The scene identifier 470 communicates its identifications of scenes to the scene analyzer 480.

For each scene, the scene analyzer 480 determines a value for three separate quality metrics, and provides those values to the budgetary analysis engine 490. The budgetary analysis engine 490 uses the values of the three quality metrics to determine the values of the three picture quality parameters for the scene, and provides those values to the signal modifier 492.

In embodiments in which the dynamic picture quality control 440 produces the adjusted digital video signal 442A (see FIG. 4), the signal modifier 492 uses the values of the three picture quality parameters to adjust the series of uncompressed images (not shown) of the scene to create a portion of the adjusted digital video signal 442A (see FIG. 4) that includes a series of uncompressed adjusted images (not shown) depicting the scene.

In embodiments in which the dynamic picture quality control 440 produces the modified digital video signal 442B (see FIG. 4), the signal modifier 492 adds the values of the three picture quality parameters as picture quality metadata to the series of uncompressed images (not shown) of the scene to create a portion of the modified digital video signal 442B (see FIG. 4).

Referring to FIG. 4, the video capture block 430, the dynamic picture quality control 440, the optional video compression block 450, the decoding block 462, and the video display interface 468 are functional blocks. The functions of each of the video capture block 430, the dynamic picture quality control 440, the optional video compression block 450, the decoding block 462, and the video display interface 468 may be implemented in a number of different ways, such as in hardware and/or in software, combined or separated.

Figure 6:
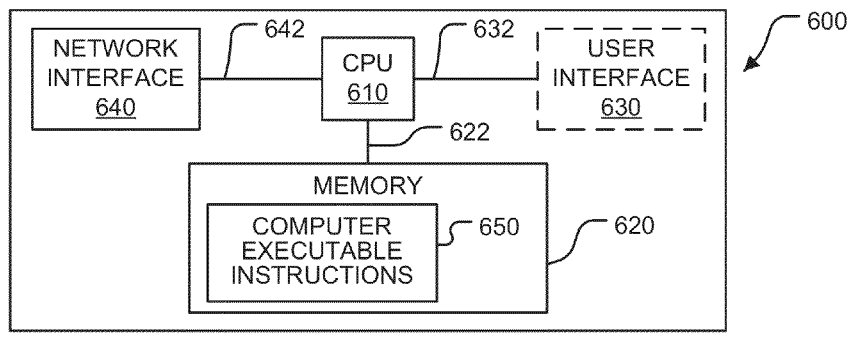
FIG. 6 is a block diagram of an exemplary computing device configured to execute software used to implement functional blocks of the system of FIG. 4.

FIG. 6 is a block diagram of an exemplary computing device 600 configured to execute software used to implement the video capture block 430, the dynamic picture quality control 440, the optional video compression block 450, the decoding block 462, and/or the video display interface 468. Such software may be implemented by computer executable instructions 650 stored in memory 620. As is apparent to those of ordinary skill in the art, the functionality of the video capture block 430, the dynamic picture quality control 440, and/or the optional video compression block 450 may be implemented using a single computing device 600 or distributed across several computing devices having substantially the same functionality as the computing device 600. Similarly, the functionality of the decoding block 462 and/or the video display interface 468 may be implemented using a single computing device 600 or distributed across several computing devices having substantially the same functionality as the computing device 600. The computing device 600 may be implemented in a number of ways, such as by the camera 422 (see FIG. 4), the display device 460 (see FIG. 4), a cable box connected to a television, a personal computer, and the like.

The computing device 600 may include a programmable central processing unit ("CPU") 610 which may be implemented by any known technology, such as a microprocessor, microcontroller, application-specific integrated circuit ("ASIC"), digital signal processor ("DSP"), or the like. The CPU 610 may be integrated into an electrical circuit, such as a conventional circuit board, that supplies power to the CPU 610. The CPU 610 may include internal memory and/or the memory 620 may be coupled thereto. The memory 620 is a computer readable medium that includes instructions or computer executable components that are executed by the CPU 610. The memory 620 may be implemented using transitory and/or non-transitory memory components. The memory 620 may be coupled to the CPU 610 by an internal bus 622.

The memory 620 may comprise random access memory ("RAM") and read-only memory ("ROM"). The memory 620 contains instructions and data that control the operation of the CPU 610. The memory 620 may also include a basic input/output system ("BIOS"), which contains the basic routines that help transfer information between elements within the computing device 600. The present invention is not limited by the specific hardware component(s) used to implement the CPU 610, the memory 620, or other components of the computing device 600.

Optionally, the memory 620 may include internal and/or external memory devices such as hard disk drives, floppy disk drives, and optical storage devices (e.g., CD-ROM, R/W CD-ROM, DVD, and the like). The computing device 600 may also include one or more I/O interfaces (not shown) such as a serial interface (e.g., RS-232, RS-432, and the like), an IEEE-488 interface, a universal serial bus ("USB") interface, a parallel interface, and the like, for the communication with removable memory devices such as flash memory drives, external floppy disk drives, and the like.

The computing device 600 may have fixed or preset parameter values for scene analysis and scene optimization. Alternatively, the computing device 600 may have adjustable or variable parameter values. If adjustable or multiple scene analysis or scene adjustment techniques are provided, the computing device 600 may include an optional user interface 630 having a computing display, such as a standard computer monitor, LCD, or other visual display. In some embodiments, a display driver may provide an interface between the CPU 610 and the user interface 630. The user interface 630 may include an input device, such as a standard keyboard, mouse, track ball, buttons, touch sensitive screen, wireless user input device, and the like. The user interface 630 may be coupled to the CPU 610 by an internal bus 632.

The computing device 600 also includes a network interface 640 configured to couple the computing device 600 to the communication network 456 (see FIG. 4). The network interface 640 may be coupled to the CPU 610 by an internal bus 642. The network interface 640 is configured to communicate (directly or via one or more intermediate interfaces) with the other components of the communication network 456 implemented using separate computing devices (e.g., the display device 460, and the like).

The various components of the computing device 600 may be coupled together by the internal buses 622, 632, and 642. Each of the internal buses 622, 632, and 642 may be constructed using a data bus, control bus, power bus, I/O bus, and the like.

Figure 7:
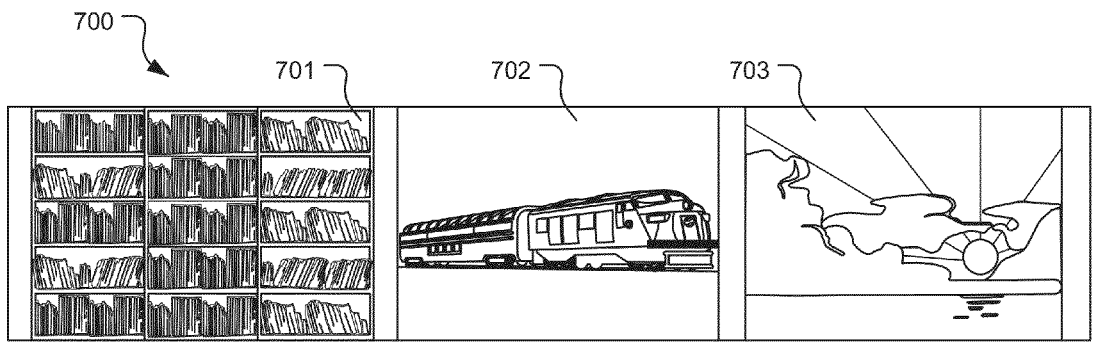
FIG. 7 is an illustration of an exemplary segment of digital video that includes three exemplary scenes.

FIG. 7 depicts an exemplary segment 700 of digital video. The segment 700 includes a first scene 701, a second scene 702, and a third scene 703. These exemplary scenes were selected to illustrate how the scene analyzer 480 distinguishes the unique qualities of each scene.

The first scene 701 depicts a library with thousands of books and magazines on the shelves. Thus, the first scene 701 may be characterized as being fairly static, highly detailed, and including complex images. To distinguish this complexity, the first scene 701 requires a large frame size (resolution). However, because the first scene 701 is fairly static, the first scene 701 does not require a particularly high frame rate. Further, a large bit depth is not required by the first scene 701.

The second scene 702 depicts a high-speed train. Thus, the second scene 702 may be characterized as being dynamic and including high-speed motion. To display such motion, a larger frame rate is needed than that required by the first scene 701. However, the second scene 702 does not require a particularly large frame size. Further, a large bit depth is not required by the second scene 702.

The third scene 703 depicts a serene sunset over a calm lake. Thus, the third scene 703 may be characterized as being fairly static, having a high dynamic range, and including subtle color shades. The high dynamic range, and subtle color shades require a large bit depth. However, the third scene 703 does not require a particularly large frame size or frame rate.

Figure 8:
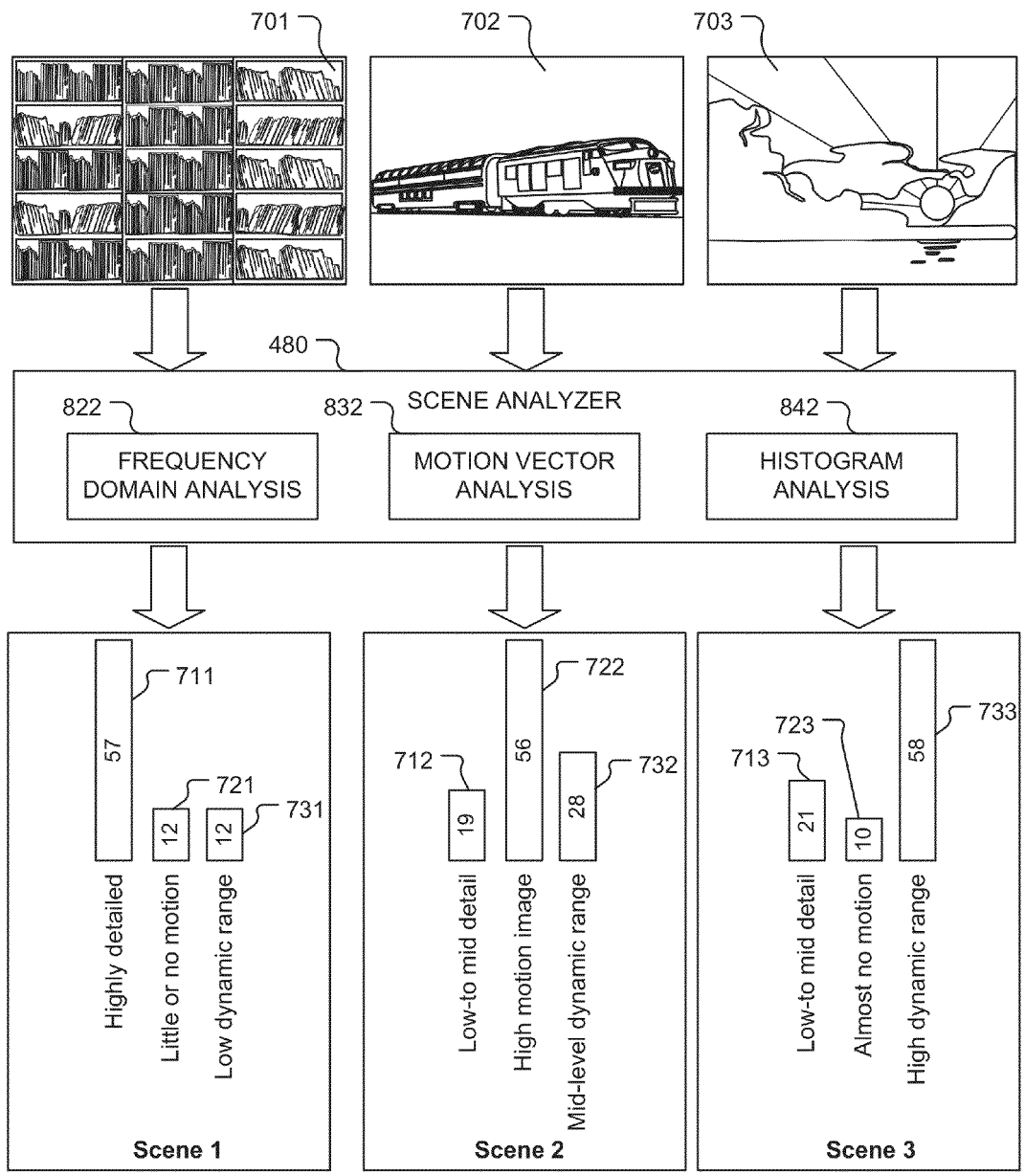
FIG. 8 is an illustration of the scene analyzer of FIG. 5 receiving (as input) each of the three scenes depicted in FIG. 7 on a scene-by-scene basis and outputting values of three separate quality metrics for each scene.
Figure 9:
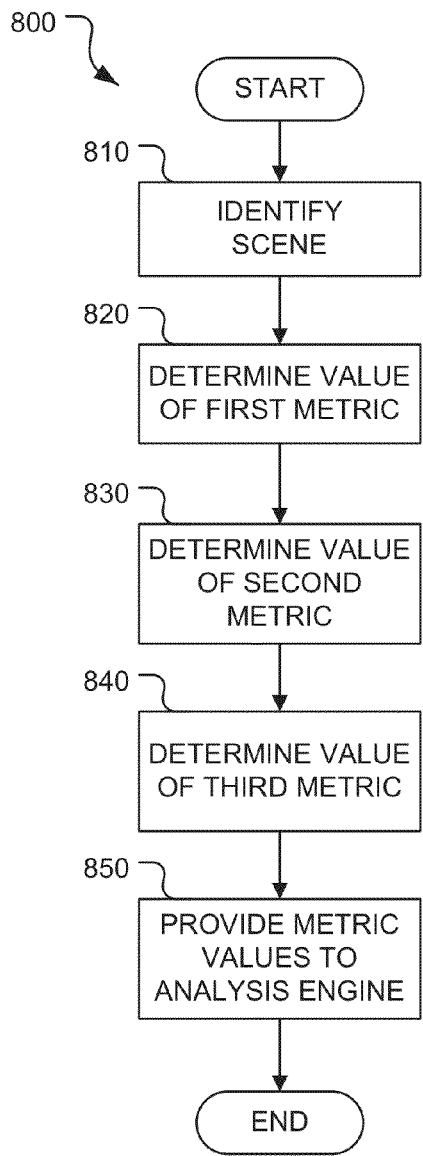
FIG. 9 is a flow diagram of a method performed by the scene analyzer of FIG. 5 that analyzes a scene to obtain the values of the three quality metrics.

FIG. 8 illustrates the scene analyzer 480 receiving each of the scenes 701, 702, and 703 on a scene-by-scene basis as input, and outputting the values of three separate quality metrics for each scene. FIG. 9 is a flow diagram of a method 800 performed by the scene analyzer 480 that analyzes a scene to obtain the values of the three quality metrics. The method 800 may use different analytical techniques to establish values for each of the three quality metrics for each of the scenes 701, 702, and 703. As explained below, the values of the quality metrics are used by the budgetary analysis engine 490 (see FIG. 5) to determine the values of the picture quality parameters used to adjust the images of each of the scenes 701, 702, and 703.

Turning to FIG. 9, in first block 810, a scene is identified. Before the method 800 is performed, the scene identifier 470 (see FIG. 5) may be used to identify frames belonging to a scene. Thus, in block 810, the scene analyzer 480 may receive an identification of a scene from the scene identifier 470. In alternate embodiments, the scene analyzer 480 may identify the scene.

As explained above, a scene is a series of consecutive frames in the uncompressed digital video signal 432 (see FIG. 4). A scene may be identified (by either the scene identifier 470 or the scene analyzer 480) using conventional methods of scene recognition. For example, successive frames may be analyzed and those that are substantially similar to one another (e.g., frames having similar amounts of detail, amounts of movement, and dynamic range levels) may be identified as belonging to the same scene. One or more computer vision techniques, image analysis techniques, and/or image processing techniques may be used to identify scenes. Non-limiting examples of such techniques include image segmentation, feature extraction, motion estimation, multi-resolution analysis, frequency domain analysis, and the like. By way of a non-limiting example, a difference detector may be used to compare a particular frame to an adjacent (previous or next) frame. When the difference between the particular frame and the adjacent frame is sufficiently large (e.g., exceeds a threshold value), a new scene is detected. On the other hand, when the difference is small (e.g., does not exceed the threshold value), the same scene is assumed.

Then, in block 820, a value of the first metric is determined for the scene. The value of the first metric indicates an amount of detail present in the scene. In block 820, the amount of detail in the scene in both the horizontal and vertical domains is measured. Then, based on these measurements, a value is assigned to the first metric for the scene. The value of the first metric may be determined using a frequency domain analysis 822 (see FIG. 8) or a multi-resolution analysis of the scene. The frequency domain analysis 822 assigns a larger value to the first metric for scenes having more high frequency components than the frequency domain analysis 822 assigns to the first metric for scenes having more low frequency components.

By way of a first non-limiting example, the scene analyzer 480 may determine the value of the first metric by using a frequency domain analysis to detect an amount of relative energy across the frequency domain. Scenes with larger amounts of energy at higher frequencies will be those scenes that demand more resolution or larger frame sizes.

By way of a second non-limiting example, the scene analyzer 480 may determine the value of the first metric using the following method:

1. analyze the scene using a multi-resolution analysis, for example, with a wavelet transform;
2. map the highest value of the first (resolution) metric (e.g. corresponding with the theoretical maximum of ultra-high-definition) to those scenes for which the wavelet analysis indicates that significant coefficients (e.g., equal to or greater than a pre-determined threshold) exist across all or most of the subbands;
3. for images for which significant coefficients exist in only some of the subbands, map the value of the first (resolution) metric to a lesser value corresponding to a lower available resolution; and
4. for those images for which significant coefficients exist in only a small number of subbands, map the value of the first (resolution) metric to a value corresponding to the lowest resolution.

In the method described above, the scales chosen for the multi-resolution analysis (e.g., the size and total number of subbands) may be a function of the number of available resolutions.

Thus, in block 820, scenes with a lot of detail are assigned a larger value than scenes with less detail.

The value of the first metric is depicted in FIG. 8 for each of the scenes 701, 702, and 703 by bars 711, 712, and 713, respectively. As explained above, the first (library) scene 701 includes more detail than the second (speeding train) scene 702 and the third (sunset) scene 703. Thus, the first (library) scene 701 has the largest value assigned to the first metric. In this example, the values assigned to the first metric for the first, second, and third scenes 701, 702, and 703 are 57, 19, and 21, respectively. In this example, the value of 57 indicates the first scene 701 includes highly detailed images. The values 19 and 21 each indicate images of the second and third scenes 702 and 703, respectively, include low-to-mid amounts of detail.

Referring to FIG. 9, in next block 830, a value of the second metric is determined for the scene. The value of the second metric indicates how much movement is present in the scene. The value of the second metric may be determined using a time-domain analysis, a motion vector analysis 832 (see FIG. 8), and the like. Scenes having more motion may be assigned a larger value than scenes with less motion.

By way of a non-limiting example, the scene analyzer 480 may determine the value of the second metric using the following method:

1. analyze the motion using a combination of interpolation filters (including subpixel and integer pixel filters), and motion estimation techniques resulting in motion vectors (including an indicator for the direction of the motion, the size of the object relative to the scene, and the horizontal and vertical displacements);
2. perform the aforementioned analysis for multiple theoretical frame rates to quantify;
3. collectively analyze motion vectors to quantify the motion for each of the theoretical frame rates noting the magnitude of the vectors with the largest displacements (optionally, motion vectors may be computed on subsets of the originally identified scene, e.g., on macroblocks within a video frame, objects identified within a scene, and the like);
4. optionally, quantify the number of directions depicting motion within the scene (the larger the number of directions, the more parts of the scene that are dynamic, and hence the greater the weight for the second (frame rate picture quality) metric); and
5. optionally, quantify distance traveled (computed using horizontal and vertical displacements) by an object (optionally considering the size of the object) across the scene.

The value of the second metric is depicted in FIG. 8 for each of the scenes 701, 702, and 703 by bars 721, 722, and 723, respectively. As explained above, the second (speeding train) scene 702 includes more motion than the first (library) scene 701 and the third (sunset) scene 703. Thus, the second (speeding train) scene 702 has the largest value assigned to the second metric. In this example, the values assigned to the second metric for the first, second, and third scenes 701, 702, and 703 are 12, 56, and 10, respectively. In this example, the value of 56 indicates the second scene 702 includes high motion images, the value of 12 indicates the images of the first scene 701 include little or no motion, and the value of 10 indicates images of the third scene 703 include almost no motion.

Referring to FIG. 9, in next block 840, a value of the third metric is determined for the scene. The value of the third metric indicates an amount and magnitude of the color variation present in the scene. The value of the third metric may be determined using a three-color histogram analysis 842 (see FIG. 8). Scenes with a high dynamic range in the color space are assigned a larger value than scenes with mid-level or low dynamic ranges.

By way of a first non-limiting example, the scene analyzer 480 may determine the value of the third metric using the following method:

1. separate the scene into its luminance and chromatic components, for example, using one or more general techniques that transform RGB color planes into YCbCr, transform RGB to YUV, and the like;
2. perform a histogram analysis on the luminance component to determine the dynamic range of sample values and their concentration across this range;
3. if the dynamic range of the sample values occupies all or most of the possible range of values (e.g. a high dynamic range), and the frequencies of these values is relatively even across the dynamic range, assign a larger value to the third (bit depth) metric because the scene exhibits a large variety of color variation; and
4. if the dynamic range is relatively small with respect to all possible values (the scene is likely to be a low contrast image), assign a smaller value to the third (bit depth) metric to indicate that a smaller number of bits can be allocated to the scene.

In the above method, a distance between the smallest and largest values occupying the dynamic range could optionally be adjusted to eliminate outliers that occur with low frequencies. The removal of outliers would aid in eliminating values from the dynamic range that would artificially inflate the value of the third metric that could otherwise be set to a lower value corresponding to a smaller bit depth.

By way of a second non-limiting example, the scene analyzer 480 may determine the value of the third metric using the same histogram detection described in the first non-limiting example above, but assign a larger value to the third (bit depth) metric for scenes with small changes or subtle changes (i.e., having lower contrast), and a smaller value to the third (bit depth) metric for scenes with high contrast. In this way, more bits could be used in the transitions between colors and shades, eliminating the quantization banding that is a common distortion of low-bit-depth video systems. High contrast images will actually require fewer bits to describe. For example, a scene with only sharp contrast of black and white might need only 1 bit to describe (at the extreme), in which "on" (or one) equals white and "off" (or zero) equals black. On the other hand, a low contrast scene that fades very gradually from pink to purple (as a sunset) with nearly the same luminosity will require a much higher bit depth to avoid quantization.

The value of the third metric is depicted in FIG. 8 for each of the scenes 701, 702, and 703 by bars 731, 732, and 733, respectively. As explained above, the third (sunset) scene 703 includes a higher dynamic range than the first (library) scene 701 and the second (speeding train) scene 702. Thus, the third (sunset) scene 703 has the largest value assigned to the third metric. In this example, the values assigned to the third metric for the first, second, and third scenes 701, 702, and 703 are 12, 28, and 58, respectively. In this example, the value of 58 indicates the third scene 703 includes high dynamic range images, the value of 28 indicates the second scene 702 includes mid-level dynamic range images, and the value of 12 indicates the first scene 701 includes low dynamic range images.

Referring to FIG. 9, after the scene has been assigned values for each of the three metrics, in block 850, the values assigned to the metrics for the scene are sent to the budgetary analysis engine 490. Then, the method 800 terminates.

Figure 10:
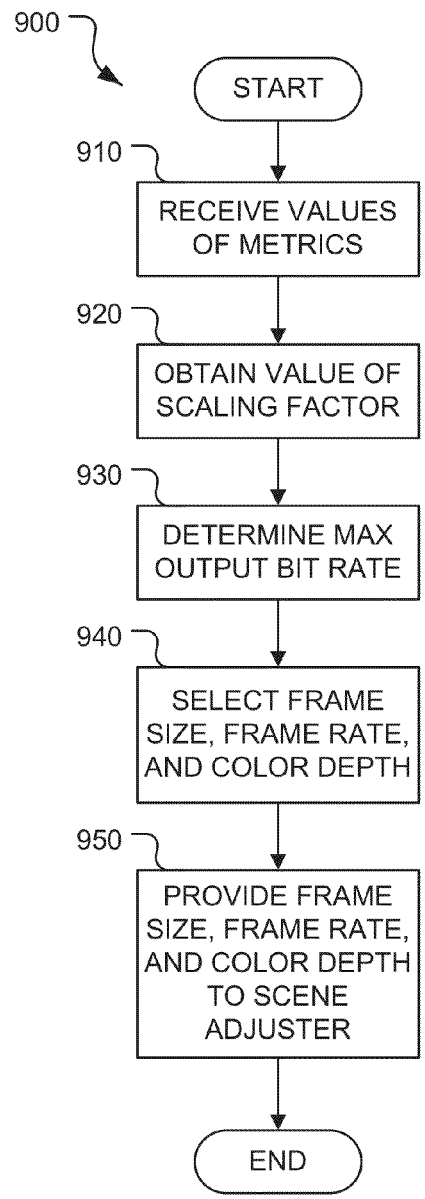
FIG. 10 is a flow diagram of a method performed by the budgetary analysis engine of FIG. 5 that uses the values of the three quality metrics to determine values for the three picture quality parameters (frame size, frame rate, and bit depth).
Figure 11:
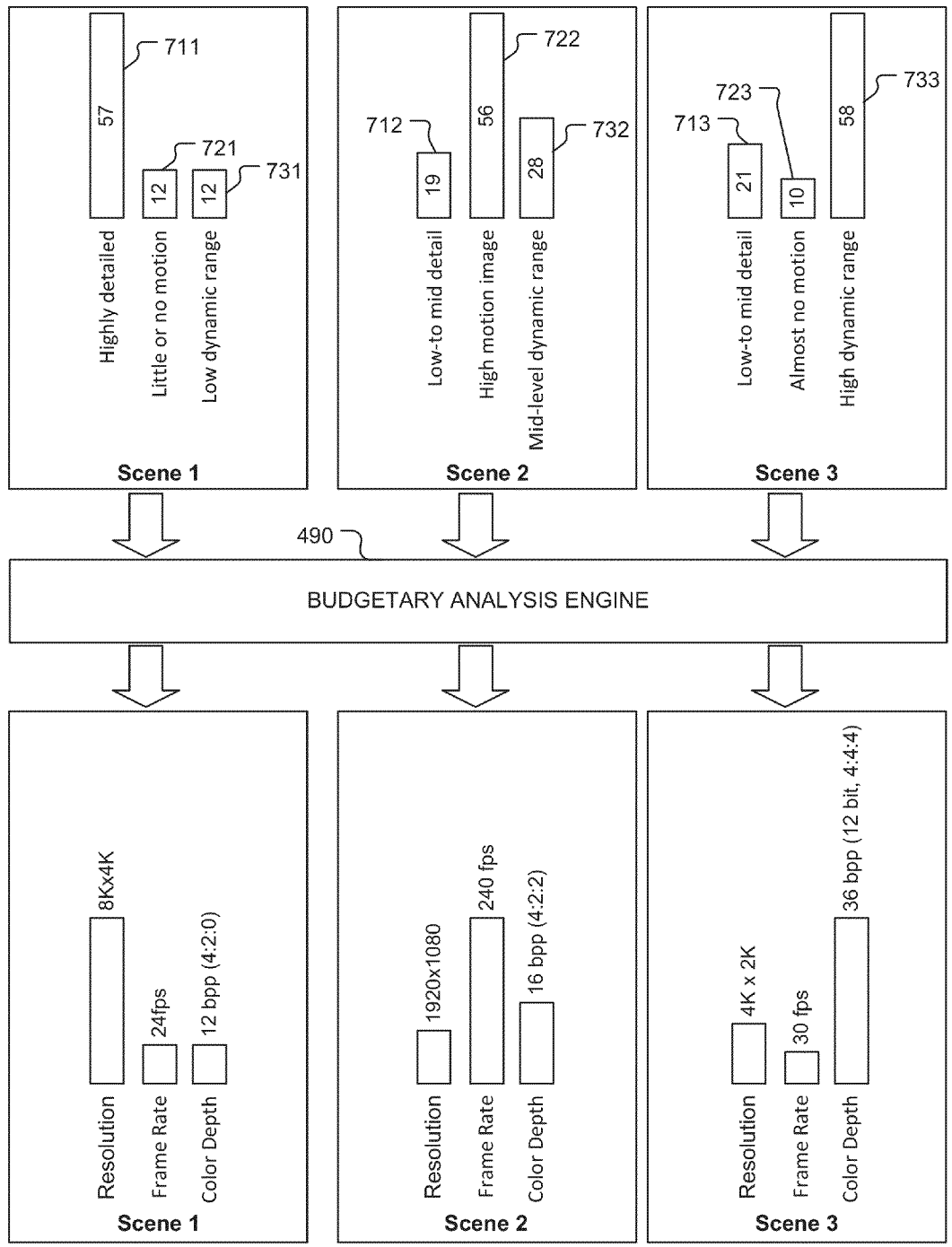
FIG. 11 is an illustration of the budgetary analysis engine of FIG. 5 receiving (as input) the values of the quality metrics for each of the scenes depicted in FIG. 7 on a scene-by-scene basis, and outputting the values of three picture quality parameters.

FIG. 10 is a flow diagram of a method 900 performed by the budgetary analysis engine 490. The method 900 uses the values of the three quality metrics (determined by the scene analyzer 480) to determine values for the three picture quality parameters (frame size, frame rate, and bit depth) used to encode the scene. FIG. 11 illustrates the budgetary analysis engine 490 receiving the values of the quality metrics for each of the scenes 701, 702, and 703 on a scene-by-scene basis as input, and outputting the values of three picture quality parameters.

Referring to FIG. 10, in first block 910, the budgetary analysis engine 490 receives the values of the three quality metrics from the scene analyzer 480.

Next, in block 920, the budgetary analysis engine 490 obtains a value of a scaling factor (e.g., from an operator) that serves as a quantified measure of a maximum perceived quality that can be supported by the system. In some embodiments, the scaling factor may be a maximum output bitrate (e.g., 10 Gbps). The maximum output bitrate may be used by the budgetary analysis engine 490 as the output bandwidth (or bitrate) constraint In block 930, the budgetary analysis engine 490 uses the value of the scaling factor to determine the maximum output bitrate. In embodiments in which the scaling factor is the maximum output bitrate, block 930 may be omitted. In embodiments in which compression is not used, the maximum output bitrate may be a maximum (uncompressed) output bitrate. In other embodiments in which compression is used, the maximum output bitrate may be a maximum (compressed) output bitrate. By way of yet another example, the maximum output bitrate may account for subsequent compression.

In block 940, the budgetary analysis engine 490 chooses a value for each of the three picture quality parameters (frame size, frame rate, and bit depth) using the values of the three metrics (determined by the scene analyzer 480) that will not exceed the maximum output bitrate. In other words, the budgetary analysis engine 490 uses the input values and the scaling factor to control the values of the frame size, frame rate, and bit depth parameters.

Optionally, the budgetary analysis engine 490 may include a first predetermined set of frame size values, a second predetermined set of frame rate values, and a third predetermined set of bit depth values.

By way of non-limiting examples, the first predetermined set of frame size values may include one or more of the exemplary frame sizes listed in Table A below.

TABLE A

| Frame Size Identifier | Horizontal (number of pixels) | Vertical (number of pixels) |
| --- | --- | --- |
| 1 | 1280 | 720 |
| 2 | 1920 | 1080 |
| 3 | 3840 | 2160 |
| 4 | 7680 | 4320 |

By way of non-limiting examples, the second predetermined set of frame rate values may include one or more of the exemplary frame rates listed in Table B below.

TABLE B

| Frame Rate Identifier | Frame rate (frames per second) |
| --- | --- |
| 1 | 16 |
| 2 | 24 |
| 3 | 30 |
| 4 | 48 |
| 5 | 60 |
| 6 | 96 |
| 7 | 120 |
| 8 | 240 |

By way of non-limiting examples, the third predetermined set of bit depth values may include one or more of the exemplary bit depths listed in Table C below.

TABLE C

| Bit Depth Identifier | Bit Depth |
| --- | --- |
| 1 | 12 bpp (8-bit 4:2:0) |
| 2 | 16 bpp (8-bit 4:2:2) |
| 3 | 24 bpp (8-bit 4:4:4) |
| 4 | 30 bpp (10-bit 4:4:4) |
| 5 | 36 bpp (12-bit 4:4:4) |

For each unique combination of the values in Tables A-C, mathematical formulas may be used to calculate a total bitrate needed to transmit images (either compressed or uncompressed) having those parameter values. Such mathematical formulas are known to those of ordinary skill in the art and will not be described in detail herein.

The budgetary analysis engine 490 uses the values of the three metrics to select one of the first predetermined set of frame size values, one of the second predetermined set of frame rate values, and one of the third predetermined set of bit depth values. The values are selected so that the digital video encoded using such values does not exceed the maximum output bitrate. As is apparent to those of ordinary skill in the art, the values may be selected using any number of mathematical optimization techniques, and the present invention is not limited to the use of any particular technique. By way of a non-limiting example, the budgetary analysis engine 490 may perform an exhaustive search over a candidate solution space consisting of at least one of the following:

1. total bitrate required to support each frame size at a particular frame rate and a particular bit depth;
2. total bitrate required to support each frame rate at a particular frame size and a particular bit depth; and
3. total bitrate required to support each bit depth at a particular frame size and a particular frame rate.

The search may allocate priority to the picture quality parameter corresponding to the metric having the highest value as determined by the scene analyzer 480, or to the picture quality parameter determined to have the highest priority based on heuristics. The result may provide a pareto optimal allocation of the bitrate across the three picture quality parameters so that the maximum bitrate that can be sustained by the system is not exceeded.

FIG. 11 provides exemplary values of the picture quality parameters determined by the budgetary analysis engine 490. In this example, the maximum output bitrate is an uncompressed bitrate of 10 Gbps. For the first (library) scene 701, the budgetary analysis engine 490 set the frame size (or resolution) parameter value equal to 8K pixels by 4K pixels, the frame rate parameter value equal to 24 fps, and the bit depth parameter value equal to 12 bpp (4:2:0). This combination of parameter values requires an (uncompressed) output bitrate of 9.56 Gbps, which is less than the maximum (uncompressed) output bitrate (e.g., 10 Gbps).

For the second (speeding train) scene 702, the budgetary analysis engine 490 set the frame size (or resolution) parameter value equal to 1920 pixels by 1080 pixels, the frame rate parameter value equal to 240 fps, and the bit depth parameter value equal to 16 bpp (4:2:2). This combination of parameter values requires an (uncompressed) output bitrate of 7.96 Gbps, which is less than the maximum (uncompressed) output bitrate (e.g., 10 Gbps).

For the third (sunset) scene 703, the budgetary analysis engine 490 set the frame size (or resolution) parameter value equal to 4K pixels by 2K pixels, the frame rate parameter value equal to 30 fps, and the bit depth parameter value equal to 36 bpp (12 bit, 4:4:4). This combination of parameter values requires an (uncompressed) output bitrate of 8.96 Gbps, which is less than the maximum (uncompressed) output bitrate (e.g., 10 Gbps).

Returning to FIG. 10, in block 950, the budgetary analysis engine 490 provides the values of the three picture quality parameters to the signal modifier 492 (see FIG. 5). Then, the method 900 terminates.

The metric values illustrated in FIGS. 8 and 11 may be characterized as being strength quotients. By way of a non-limiting example, the values of the first, second, and third metrics may each range from about zero (low complexity) to about 100 (high complexity). The exemplary scenes 701, 702, and 703 (see FIG. 8) were selected to illustrate examples in which one of the picture quality parameters (frame size, frame rate, and bit depth) has a significantly higher demand than the other picture quality parameters. In a real digital video signal (that includes multiple successive scenes), the values of the first, second, and third metrics will be changing constantly. Further, it is possible that the values of the first, second, and third metrics could be equal. If this occurs, the budgetary analysis engine 490 (see FIG. 5) may use predetermined values for the picture quality parameters.

By performing the methods 800 and 900, the dynamic picture quality control 440 may apportion the available output bitrate based on the unique qualities (as quantified by the three quality metrics) of the scenes 701, 702, and 703.

The signal modifier 492 uses the values of the three picture quality parameters to modify the uncompressed digital video signal 432. If the dynamic picture quality control 440 outputs the uncompressed adjusted digital video signal 442A, the signal modifier 492 adjusts the series of uncompressed images in the scene to create a portion of the uncompressed adjusted digital video signal 442A that includes a series of uncompressed adjusted images depicting the scene. The portion of the adjusted digital video signal 442A (see FIG. 4) may include the values of the three picture quality parameters for use by the decoding block 462 (see FIG. 4) when decoding the uncompressed or compressed adjusted digital video signal 442A or 452.

As mentioned above, in some embodiments, the uncompressed adjusted digital video signal 442A is compressed by the video compression block 450 (see FIG. 4) to produce the compressed adjusted digital video signal 452. In such embodiments, the video compression block 450 is configured to compress the uncompressed adjusted digital video signal 442A, which includes images and series of images that vary based on the three picture quality parameters.

In embodiments in which the dynamic picture quality control 440 outputs the modified digital video signal 442B, the signal modifier 492 adds the values of the three picture quality parameters to the uncompressed digital video signal 432 as picture quality metadata. The modified digital video signal 442B is transmitted to the video compression block 450 (see FIG. 4), which both adjusts and compresses the series of uncompressed images in the scene to produce the compressed adjusted digital video signal 452.

Compressed Domains

In the compressed video domain, the three picture quality parameters also help determine picture quality, but a fourth component (compression) is also a primary factor. The bandwidth required to transmit higher quality pictures is always a concern economically and technologically for both compressed and uncompressed domains. Furthermore, the available bandwidth to transmit video signals may or may not be provided at a constant rate. For traditional QAM/MPEG-TS based digital video transport, a constant bit-rate is available, but is a precious resource that must be managed for the maximum return on investment. Likewise, with uncompressed video interfaces (such as High-Definition Multimedia Interface ("HDMI") and Displayport), the maximum available bandwidth still limits the ability to expand these parameters for higher picture quality.

For Internet Protocol ("IP") based video transport (where wireless networks may be involved), the available bandwidth can vary greatly depending upon physical, atmospheric, geographic, and electromagnetic interference factors. A new adaptive bitrate approach being standardized by MPEG (DASH) specifically addresses this uncertainly over available bandwidth on the network by enabling a gradual or graceful degradation of the picture quality as the network bandwidth diminishes. This is achieved primarily by reducing the frame sizes and increasing the compression rates, but reducing frame rates is also available as a useful method in extreme cases.

In environments in which available bandwidth is not constant, in block 930 of the method 900, the budgetary analysis engine 490 may determine the maximum output bitrate based at least in part on an available bitrate. In such embodiments, the output bandwidth (or bitrate) constraint is not constant and varies along with the available bitrate.

Further, an amount of compression applied to the images of the scene may be used as a fourth picture quality parameter. Either the scene analyzer 480 or the budgetary analysis engine 490 may determine the amount of compression. By way of non-limiting example, the budgetary analysis engine 490 may include a fourth predetermined set of compression values (or options). The budgetary analysis engine 490 uses the values of the three metrics to select one of the first predetermined set of frame size values, one of the second predetermined set of frame rate values, one of the third predetermined set of bit depth values, and one of the fourth predetermined set of compression values. The values are selected so that the digital video encoded using such values does not exceed the maximum output bitrate. As is apparent to those of ordinary skill in the art, the values may be selected using any number of mathematical optimization techniques, and the present invention is not limited to the use of any particular technique.

MPEG Based Encoding

A profile is a defined set of coding tools that may be used to create a bit stream that conforms to the requirements of the profile. An encoder for a profile may choose which features to use as long as the encoder generates a conforming bit stream. A decoder for the same profile must support all features that can be used in that profile.

New profiles may be added to existing codec standards or those under development (e.g., High Efficiency Video Codec ("HEVC")) to permit adaptive use of frame size (or resolution), frame rate, bit depth, and optionally compression. This adaptive encoding process could be limited to sequences of frames (scenes), and may be structured to enable adaptive encoding on a frame-by-frame basis, at the macroblock (sub-picture) level.

This approach is distinguishable from conventional approaches, such as Scalable Video Coding ("SVC") and Dynamic Adaptive Streaming of Hypertext Transfer Protocol ("DASH"). SVC enables the simultaneous encoding/decoding of multiple spatial resolutions for a given piece of content by using a base layer and an enhancement layer. SVC does not dynamically adapt to the content, instead it allows the decoder to choose the amount of spatial resolution it needs. While DASH provides graceful degradation when transmission paths are constrained by reducing resolution or frame rate, DASH does not optimize utilization of an output bitrate based on scene content.

Decoder Design and Construction

Turning to FIG. 4, the decoding block 462 is configured to provide tight coupling between the decoded picture buffer 464 and the frame-scaler 466. The decoded picture buffer 464 may signal the values of the picture quality parameter used in the compressed adjusted digital video signal 452 to the frame-scaler 466 so that the frame-scaler 466 can distinguish between the frame-size, frame-rate, and bit depth provided in the compressed adjusted digital video signal 452 with the frame-size, frame-rate, and bit depth required by the display device 460. Such coupling allows the decoding block 462 to scale (expand or reduce) in real time each decoded picture having a frame size value that is different from the selected frame size of the display device 460. While some currently available decoders can perform scaling, they frequently create picture disruptions when frame size (resolution) values change. The tight coupling between the decoded picture buffer 464 and the frame-scaler 466 in the decoding block 462 helps prevent such disruptions.

As mentioned above, in some embodiments, in addition to the selected frame size, the display device 460 may also have the selected bit depth, and/or the selected frame rate. In such embodiments, the frame-scaler 466 is configured to scale (expand or reduce) both the bit depth, and the frame rate of the content (scenes, frames, or macroblocks) based on the selected bit depth and selected frame rate of the display device 460. The selected frame size, the selected frame rate, and the selected bit depth may be characterized as maximum values. Any scene, frame, or macroblock encoded at these maximum values will pass through the frame-scaler 466 unmodified. On the other hand, any scene, frame, or macroblock encoded at less than the maximum values will be upscaled for any parameter less than the maximum.

Video Display Interface

Today's high-speed digital video interfaces deliver uncompressed video quality at very high data rates. The physical layer of such systems are fast approaching a point of diminishing returns on adding complexity to transmitters, cables, and receivers where it seems unlikely that a practical low-cost solution will be available to deliver 8K digital video at 120 fps (which is 16 times faster than today's interfaces).

Like the frame-scaler 466, the video display interface 468 may include a scaler configured to dynamically upconvert (and/or reduce) frame-size (resolution), frame-rate, and/or bit depth as needed based on the parameter values determined by the budgetary analysis engine 490 (see FIG. 5). The signal received from the decoding block 462 may include these parameter values (or other information usable by the video display interface 468) that the video display interface 468 may use to adjust the signal provided to the user display 469, as needed.

As mentioned above, the uncompressed or compressed adjusted digital video signal 442A or 452 may include information indicating the values of the picture quality parameters. Thus, the signal 442A or the signal 452 may provide varying quality levels in each of the three picture quality parameters simultaneously with seamless transitions between adjustments. By way of a non-limiting examples, additional signaling messages may be used to communicate which picture quality parameter values are being changed and when such changes are occurring.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A computer-implemented method performed by one or more computing devices, the method comprising:
identifying first and second portions of an uncompressed digital video signal, the first and second portions depicting first and second scenes, respectively, the first and second portions being contiguous with the first portion being before the second portion within the uncompressed digital video signal;
determining first values of a plurality of quality metrics for the first portion of the uncompressed digital video signal;
determining second values of the plurality of quality metrics for the second portion of the uncompressed digital video signal;
determining first values for a plurality of picture quality parameters based at least in part on the first values of the plurality of quality metrics such that a signal transmitted using the first values of the plurality of picture quality parameters requires at most a maximum output bitrate, the plurality of picture quality parameters comprising a frame size parameter, a frame rate parameter, and a bit depth parameter wherein determining the first values for the plurality of picture quality parameters comprises searching a candidate solution space comprising at least one of (a) total bitrate required to support each of the plurality of frame sizes at a selected one of a plurality of frame rates and a selected one of a plurality of bit depths, (b) total bitrate required to support each of the plurality of frame rates as a selected one of the plurality of frame sizes and a selected a selected one of the plurality of bit depths, and (c) total bitrate required to support each of the plurality of bit depths at a selected one of the plurality of frame sizes and a selected one of the plurality of frame rates;
determining second values for the plurality of picture quality parameters based at least in part on the second values of the plurality of quality metrics such that a signal transmitted using the second values of the plurality of picture quality parameters requires at most the maximum output bitrate, the second values of the plurality of picture quality parameters being different from the first values of the plurality of picture quality parameters;
adjusting the first portion using the first values of the plurality of picture quality parameters;
adjusting the second portion using the second values of the plurality of picture quality parameters; and
transmitting the adjusted first portion and the adjusted second portion in a continuous signal, the adjusted first and second portions being contiguous with the adjusted first portion being before the adjusted second portion within the continuous signal.

2. The method of claim 1, wherein the plurality of quality metrics comprises a first metric, a second metric, and a third metric,
the frame size parameter is determined at least in part based on the first metric,
the frame rate parameter is determined at least in part based on the second metric,
the bit depth parameter is determined at least in part based on the third metric, and
determining the first values for the plurality of picture quality parameters based at least in part on the first values of the plurality of quality metrics further comprises:
(i) allocating priority to the frame size parameter if the first value of the first metric is larger than both the first value of the second metric, and the first value of the third metric,
(ii) allocating priority to the frame rate parameter if the first value of the second metric is larger than both the first value of the first metric, and the first value of the third metric, and
(iii) allocating priority to the bit depth parameter if the first value of the third metric is larger than both the first value of the first metric, and the first value of the second metric.

3. The method of claim 1, further comprising:
before transmitting the adjusted first portion, compressing the adjusted first portion; and
before transmitting the adjusted second portion, compressing the adjusted second portion.

4. The method of claim 3, wherein the adjusted first and second portions are compressed in accordance with an MPEG standard or a JPEG standard.

5. The method of claim 1, further comprising:
receiving the uncompressed digital video signal, wherein the continuous signal is transmitted substantially in real time with respect to receiving the uncompressed digital video signal.

6. The method of claim 1, wherein the plurality of quality metrics comprise:

a first quality metric indicating an amount of detail in an identified portion of the uncompressed digital video signal, the first and second values of the frame size parameter being determined at least in part based on the first and second values, respectively, of the first quality metric, a second quality metric indicating an amount of motion in the identified portion of the uncompressed digital video signal, the first and second values of the frame rate parameter being determined at least in part based on the first and second values, respectively, of the second quality metric, and a third quality metric indicating an amount and magnitude of color variation present in the identified portion of the uncompressed digital video signal, the first and second values of the bit depth parameter being determined at least in part based on the first and second values, respectively, of the third quality metric.

7. The method of claim 1, wherein the plurality of quality metrics comprises a first quality metric, the first value of the frame size parameter is determined at least in part based on the first value of the first quality metric, the second value of the frame size parameter is determined at least in part based on the second value of the first quality metric, and the method further comprises:

performing at least one of a frequency domain analysis and a multi-resolution analysis on the first portion of the uncompressed digital video signal to determine a first amount of detail in the first portion of the uncompressed digital video signal;

assigning the first value to the first quality metric based at least in part on the first amount of detail in the first portion of the uncompressed digital video signal;

performing the at least one of the frequency domain analysis and the multi-resolution analysis on the second portion of the uncompressed digital video signal to determine a second amount of detail in the second portion of the uncompressed digital video signal; and assigning the second value to the first quality metric based at least in part on the second amount of detail in the second portion of the uncompressed digital video signal.

8. The method of claim 1, wherein the plurality of quality metrics comprises a second quality metric, the first value of the frame rate parameter is determined at least in part based on the first value of the second quality metric, the second value of the frame rate parameter is determined at least in part based on the second value of the second quality metric, and the method further comprises:

performing at least one of a motion vector analysis and a time-domain analysis on the first portion of the uncompressed digital video signal to determine a first amount of motion in the first portion of the uncompressed digital video signal;

assigning the first value to the second quality metric based at least in part on the first amount of motion in the first portion of the uncompressed digital video signal;

performing the at least one of the motion vector analysis and the time-domain analysis on the second portion of the uncompressed digital video signal to determine a second amount of motion in the second portion of the uncompressed digital video signal; and assigning the second value to the second quality metric based at least in part on the second amount of motion in the second portion of the uncompressed digital video signal.

9. The method of claim 1, wherein the plurality of quality metrics comprises a third quality metric, the first value of the bit depth parameter is determined at least in part based on the first value of the third quality metric, the second value of the bit depth parameter is determined at least in part based on the second value of the third quality metric, and the method further comprises:

performing a three-color histogram analysis on the first portion of the uncompressed digital video signal to determine a first amount of color variation present in the first portion of the uncompressed digital video signal;

assigning the first value to the third quality metric based at least in part on the first amount of color variation in the first portion of the uncompressed digital video signal;

performing the three-color histogram analysis on the second portion of the uncompressed digital video signal to determine a second amount of color variation in the second portion of the uncompressed digital video signal; and assigning the second value to the third quality metric based at least in part on the second amount of color variation in the second portion of the uncompressed digital video signal.

10. The method of claim 1, wherein the maximum output bitrate is a first maximum output bitrate, and the method further comprises:

obtaining a second maximum output bitrate, the second maximum output bitrate being different from the first maximum output bitrate;

identifying a third portion of the uncompressed digital video signal;

determining third values for the plurality of quality metrics for the third portion of the uncompressed digital video signal;

determining third values for the plurality of picture quality parameters based at least in part on the third values of the plurality of quality metrics such that a signal transmitted using the third values of the plurality of picture quality parameters requires at most the second maximum output bitrate, the third values of the plurality of picture quality parameters being different from the second values of the plurality of picture quality parameters;

adjusting the third portion using the third values of the plurality of picture quality parameters; and transmitting the adjusted third portion in the continuous signal.

11. The method of claim 10, wherein the third portion is immediately adjacent to the second portion in the uncompressed digital video signal, and the adjusted third portion is transmitted after the adjusted second portion in the continuous signal.

12. The method of claim 1, further comprising:

determining a first compression value for the first portion of the uncompressed digital video signal, the first compression value indicating an amount of compression to be applied to the first portion;

determining a second compression value for the second portion of the uncompressed digital video signal, the second compression value indicating an amount of compression to be applied to the second portion;

compressing the adjusted first portion in accordance with the first compression value before the adjusted first portion is transmitted; and compressing the adjusted second portion in accordance with the second compression value before the adjusted second portion is transmitted.

13. The method of claim 12, wherein the second compression value is different from the first compression value.

14. The method of claim 1, further comprising:
transmitting the first and second values of the plurality of picture quality parameters in the continuous signal.

15. A computer-implemented method performed by one or more computing devices, the method comprising:
receiving a signal encoding a first series of images depicting a first scene, and a second series of images depicting a second scene, the second series of images being contiguous with the first series of images in the signal, the first series of images having been adjusted using first values of a plurality of picture quality parameters before being encoded, the second series of images having been adjusted using second values of the plurality of picture quality parameters before being encoded, the first values being different from the second values, the signal comprising the first and second values, the plurality of picture quality parameters comprising a frame size parameter, a frame rate parameter, and a bit depth parameter, wherein the first values of the plurality of picture quality parameters were determined by searching a candidate solution space comprising at least one of (a) total bitrate required to support each of a plurality of frame sizes at a selected one of a plurality of frame rates and a selected one of a plurality of bit depths, (b) total bitrate required to support each of the plurality of frame rates at a selected one of the plurality of frame sizes and a selected one of the plurality of bit depths, and (c) total bitrate required to support each of the plurality of bit depths at a selected one of the plurality of frame sizes and a selected one of the plurality of frame rates;
decoding the first series of images using the first values;
decoding the second series of images using the second values; and
displaying the first series of images before the second series of images without disruption therebetween.

16. The method of claim 15, further comprising:
scaling at least one of the first and second series of images by at least one of the plurality of picture quality parameters before the scaled at least one of the first and second series of images is displayed.

17. A dynamic picture quality control device for use with a communication network, the device comprising:
at least one processor;
a memory connected to the at least one processor and storing computer-executable instructions that when executed by the at least one processor cause the at least one processor to:
(a) identify first and second contiguous portions of an uncompressed digital video signal, the first and second portions depicting first and second scenes, respectively,
(b) determine first values of a plurality of quality metrics for the first portion of the uncompressed digital video signal,
(c) determine different second values of the plurality of quality metrics for the second portion of the uncompressed digital video signal,
(d) determine first values for a plurality of picture quality parameters based at least in part on the first values of the plurality of quality metrics such that a signal transmitted using the first values of the plurality of picture quality parameters requires at most a maximum output bitrate, the plurality of picture quality parameters comprising a frame size parameter, a frame rate parameter, and a bit depth parameter, wherein determining the first values for the plurality of picture quality parameters comprises searching a candidate solution space comprising at least one of (a) total bitrate required to support each of a plurality of frame sizes at a selected one of a plurality of frame rates and a selected one of a plurality of bit depths, (b) total bitrate required to support each of the plurality of frame rates at a selected one of the plurality of frame sizes and a selected one of the plurality of bit depths, and (c) total bitrate required to support each of the plurality of bit depths at a selected one of the plurality of frame sizes and a selected one of the plurality of frame rates
(e) determine different second values for the plurality of picture quality parameters based at least in part on the second values of the plurality of quality metrics such that a signal transmitted using the second values of the plurality of picture quality parameters requires at most the maximum output bitrate,
(f) adjust the first portion using the first values of the plurality of picture quality parameters, and
(g) adjust the second portion using the second values of the plurality of picture quality parameters; and
a network interface connected to the communication network, the network interface being configured to transmit the adjusted first portion and the adjusted second portion in a continuous signal.

18. The device of claim 17, wherein the computer-executable instructions when executed b the at least one processor, cause the at least one processor to encode the adjusted first and second portions in accordance with an MPEG standard or a JPEG standard.

19. The device of claim 17, further comprising:
a user interface configured to receive a scaling factor from a user, wherein the computer-executable instructions, when executed by the at least one processor, cause the at least one processor to obtain the maximum output bitrate by determining the maximum output bitrate based at least in part on the scaling factor.

20. The device of claim 17, wherein the plurality of quality metrics comprise:
a first quality metric indicating an amount of detail in an identified portion of the uncompressed digital video signal, the first and second values of the frame size parameter being determined at least in part based on the first and second values, respectively, of the first quality metric,
a second quality metric indicating an amount of motion in the identified portion of the uncompressed digital video signal, the first and second values of the frame rate parameter being determined at least in part based on the first and second values, respectively, of the second quality metric, and
a third quality metric indicating an amount and magnitude of color variation present in the identified portion of the uncompressed digital video signal, the first and second values of the bit depth parameter being determined at least in part based on the first and second values, respectively, of the third quality metric.

21. A system for use with a network, the system comprising:
a device configured to transmit a continuous signal over a communication network, the signal encoding a series of contiguous portions of a digital video, each portion depicting a different scene and having been adjusted by a frame size value, a frame rate value, and a bit depth value before having been encoded, the signal comprising the frame size value, the frame rate value, and the bit depth value for each of the series of contiguous portions, the frame size value of one of the portions being different from the frame size value of a different one of the portions, the frame rate value of one of the portions being different from the frame rate value of a different one of the portions, the bit depth value of one of the portions being different from the bit depth value of a different one of the portions, wherein determining the frame size value, the frame rate value, and the bit depth value for each of the series of contiguous portions comprises searching a candidate solution space comprising at least one of (a) total bitrate required to support each of a plurality of frame sizes at a selected one of a plurality of frame rates and a selected one of a plurality of bit depths, (b) total bitrate required to support each of the plurality of frame rates at a selected one of the plurality of frame sizes and a selected one of the plurality of bit deaths and (c) total bitrate required to support each of the plurality of bit depths at a selected one of the plurality of frame sizes and a selected one of the plurality of frame rates; and a plurality of display devices each comprising:

a network interface connected to the communication network, and configured to receive the continuous signal;

at least one processor;

a memory storing computer-executable instructions that when executed by the at least one processor cause the at least one processor to decode the series of contiguous portions; and a user display configured to display the decoded series of contiguous portions of the digital video to a user.

22. The system of claim 21, wherein the series of contiguous portions are encoded in accordance with an MPEG standard or a JPEG standard.

23. The system of claim 21, wherein each of the series of contiguous portions comprises a plurality of images, and the plurality of display devices each comprises a frame-scaler configured to scale the plurality of images of at least one of the series of contiguous portions before the scaled at least one of the series of contiguous portions is displayed.

24. The system of claim 21, wherein the plurality of display devices each comprises a video display interface configured to adjust at least one of the decoded series of contiguous portions, and provide the adjusted at least one of the decoded series of contiguous portions to the user display for display thereby.

* * * * *